United States Patent
Law

(10) Patent No.: US 8,984,057 B2
(45) Date of Patent: Mar. 17, 2015

(54) METHODS AND APPARATUSES FOR SYNCHRONIZING AND MANAGING CONTENT OVER MULTIPLE DEVICES

(71) Applicant: Sony Computer Entertainment Inc., Tokyo (JP)

(72) Inventor: Ho Kee Law, San Jose, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/750,580

(22) Filed: Jan. 25, 2013

(65) Prior Publication Data

US 2013/0144940 A1 Jun. 6, 2013

Related U.S. Application Data

(63) Continuation of application No. 11/890,681, filed on Aug. 7, 2007, now Pat. No. 8,375,133.

(51) Int. Cl.
*H04L 29/06* (2006.01)
*H04L 29/08* (2006.01)

(52) U.S. Cl.
CPC ............ *H04L 65/60* (2013.01); *H04L 65/4069* (2013.01); *H04L 67/1095* (2013.01); *H04L 67/142* (2013.01); *H04L 67/143* (2013.01)
USPC ........... 709/203; 709/227; 709/228; 709/246; 725/80; 725/87; 725/112

(58) Field of Classification Search
CPC ...................................................... H04L 65/60
USPC .......................... 709/203; 725/80, 86, 87, 109
See application file for complete search history.

(56) References Cited

U.S. PATENT DOCUMENTS

| | | | | |
|---|---|---|---|---|
| 6,560,655 | B1 * | 5/2003 | Grambihler et al. | 709/248 |
| 6,574,663 | B1 | 6/2003 | Bakshi et al. | |
| 7,174,492 | B1 * | 2/2007 | Chung et al. | 714/727 |
| 7,899,915 | B2 * | 3/2011 | Reisman | 709/228 |
| 8,375,133 | B2 | 2/2013 | Law | |
| 2004/0027375 | A1 * | 2/2004 | Ellis et al. | 345/753 |
| 2005/0096053 | A1 | 5/2005 | Liu et al. | |
| 2005/0097623 | A1 * | 5/2005 | Tecot et al. | 725/136 |

(Continued)

FOREIGN PATENT DOCUMENTS

| | | |
|---|---|---|
| JP | 2003-244289 A | 8/2003 |
| JP | 2003-288286 A | 10/2003 |

(Continued)

OTHER PUBLICATIONS

"TIVO: Viewers Guide"—TIVO, Oct. 2006 http://support.tivo.com/euf/assets/files/TiVo%20Series2%20Dual%20Tuner%20DVR%20Viewers%20Guide.pdf.*

(Continued)

*Primary Examiner* — Randy Scott
(74) *Attorney, Agent, or Firm* — Fitch, Even, Tabin & Flannery, LLP

(57) ABSTRACT

In one embodiment, the methods and apparatuses detect an active device configured to utilize content; identify the content and a current location of the content; detect an idle device configured to selectively deliver the content; detect a transition parameter for determining a transition to the idle device; and transition the content from the active device to the idle device wherein the idle device is capable of utilizing the content based on the transition parameter.

24 Claims, 7 Drawing Sheets

(56) References Cited

U.S. PATENT DOCUMENTS

| | | | |
|---|---|---|---|
| 2005/0198353 | A1 | 9/2005 | Zmrzli |
| 2005/0198661 | A1 | 9/2005 | Collins et al. |
| 2005/0235047 | A1 | 10/2005 | Li et al. |
| 2005/0246746 | A1* | 11/2005 | Yui et al. .................... 725/80 |
| 2006/0153198 | A1 | 7/2006 | Chadha |
| 2006/0168300 | A1 | 7/2006 | An et al. |
| 2006/0190974 | A1* | 8/2006 | Lee ............................ 725/87 |
| 2006/0195473 | A1 | 8/2006 | Lin et al. |
| 2006/0233519 | A1 | 10/2006 | Narita |
| 2006/0242259 | A1 | 10/2006 | Vallabh et al. |
| 2008/0200154 | A1 | 8/2008 | Maharajh et al. |
| 2008/0240373 | A1 | 10/2008 | Wilhelm |
| 2009/0067367 | A1* | 3/2009 | Buracchini et al. .......... 370/328 |

FOREIGN PATENT DOCUMENTS

| | | |
|---|---|---|
| JP | 2004-102415 A | 4/2004 |
| JP | 2004-159099 A | 6/2004 |
| JP | 2004-240906 A | 8/2004 |
| JP | 2004-265139 A | 9/2004 |
| JP | 2005-159439 A | 6/2005 |
| JP | 2006-236324 A | 9/2006 |

OTHER PUBLICATIONS

Patent Cooperation Treaty; "Notification of Transmittal of the International Search Report and the Written Opinion of the International Searching Authority, or the Declaration" issued in corresponding foreign application No. PCT/US2008/070352, mailed Oct. 7, 2008, 1 page.

Patent Cooperation Treaty; "International Search Report" issued in corresponding foreign application No. PCT/US2008/070352, mailed Oct. 7, 2008, 2 pages.

Patent Cooperation Treaty; "Written Opinion of the International Searching Authority" issued in corresponding foreign application No. PCT/US2008/070352, mailed Oct. 7, 2008, 5 pages.

USPTO; Office Action issued in U.S. Appl. No. 11/890,681, mailed Jun. 1, 2009, 15 pages.

USPTO; Office Action issued in U.S. Appl. No. 11/890,681, mailed Mar. 1, 2010, 18 pages.

USPTO; Final Office Action issued in U.S. Appl. No. 11/890,681, mailed Aug. 18, 2010, 15 pages.

USPTO; Advisory Action issued in U.S. Appl. No. 11/890,681, mailed Nov. 8, 2010, 3 pages.

USPTO; Office Action issued in U.S. Appl. No. 11/890,681, mailed Dec. 9, 2010, 14 pages.

USPTO; Final Office Action issued in U.S. Appl. No. 11/890,681, mailed May 24, 2011, 14 pages.

USPTO; Applicant-Initiated Interview Summary issued in U.S. Appl. No. 11/890,681, mailed Sep. 27, 2011, 3 pages.

USPTO; Office Action issued in U.S. Appl. No. 11/890,681, mailed Oct. 24, 2011, 14 pages.

USPTO; Examiner-Initiated Interview Summary issued in U.S. Appl. No. 11/890,681, mailed Mar. 28, 2012, 3 pages.

USPTO; Examiner-Initiated Interview Summary issued in U.S. Appl. No. 11/890,681, mailed May 24, 2012, 2 pages.

USPTO; Final Office Action issued in U.S. Appl. No. 11/890,681, mailed Jun. 20, 2012, 15 pages.

USPTO; Notice of Allowance issued in U.S. Appl. No. 11/890,681, mailed Oct. 10, 2012, 15 pages.

USPTO; Applicant-Initiated Interview Summary issued in U.S. Appl. No. 11/890,681, mailed Dec. 18, 2012, 3 pages.

"Activity Recognition in the Home Setting Using Simple and Ubiquitous Sensors."—Tapia / MIT Sep. 2003; http://stuff.mit.edu/afs/sipb/project/wine/dosdevices/z:/mit/lugia/MacData/afs.cron/group/house_n/documents/Tapia03.pdf.

Japanese Patent Office; Notification of Reasons for Refusal issued in corresponding Japanese Patent Application No. 2010-520059; dated May 15, 2012; 5 pages (includes English translation).

Japanese Patent Office; Final Notification of Reasons for Refusal issued in corresponding Japanese Patent Application No. 2010-520059; dated Nov. 13, 2012; 5 pages.

European Patent Office; "Extended European Search Report" issued in corresponding European Patent Application No. 08796255.1, dated May 6, 2013, 11 pages.

Shacham, Ron, et al.; "Ubiquitous Device Personalization and Use: The Next Generation of IP Multimedia Communications", ACM Transactions on Multimedia Computing Communications and Applications, Association for Computing Machinery, vol. 3, No. 2, May 2007, pp. 1-20.

European Patent Office; "Communication pursuant to Article 94(3) EPC" issued in corresponding European Patent Application No. 08796255.1, dated Jan. 20, 2014, 6 pages.

* cited by examiner

METHODS AND APPARATUSES FOR SYNCHRONIZING AND MANAGING CONTENT OVER MULTIPLE DEVICES

CROSS-REFERENCE TO RELATED APPLICATIONS

This application is a continuation of U.S. patent application Ser. No. 11/890,681, filed Aug. 7, 2007, entitled "METHODS AND APPARATUSES FOR SYNCHRONIZING AND MANAGING CONTENT OVER MULTIPLE DEVICES," the entire disclosure of which is hereby fully incorporated by reference herein in its entirety.

FIELD OF THE INVENTION

The present invention relates generally to detecting image information and, more particularly, to dynamically detecting and generating image information.

BACKGROUND

There are many audio/visual devices that are capable of reproducing audio signals and/or displaying visual images to a user. These devices are typically either mobile devices or stationary devices. Examples of mobile devices include portable music and video players, cellular telephones, personal digital assistants, and laptop computers. Examples of stationary devices include large screen televisions, home stereos, and desktop computers.

The content reproduced for the user on the audio/visual devices may originate from many sources. For example, the content may include media distributed via the air waves, cable, the Internet, digital video discs (DVDs), and compact discs (CDs). In addition, there are many ways for the user to store this content for future use.

Given the flexibility in utilizing and storing the content, there are challenges in managing the content in such a manner that allows the user to gain convenient access to the content.

SUMMARY

One embodiment provides a method comprising: detecting an active device utilizing content and reproducing the content for a user; identifying the content and a current location of the content; tracking a location of the active device as the active device moves; detecting one or more potential target devices configured to selectively reproduce the content for the user; detecting a transition parameter; determining whether a transition to one of the one or more potential target devices should occur based on at least the detected transition parameter; and transitioning the content from the active device to one of the one or more potential target devices, wherein the one of the one or more potential target devices begins utilizing the content and reproducing the content; wherein the transition parameter comprises the location of the active device relative to the one of the one or more potential target devices.

Another embodiment provides a system, comprising: a content detection module configured for detecting content and a current location of the content; a device detection module configured for detecting an active device and one or more potential target devices and further configured for detecting a location for the active device and a location for the one or more potential target devices, wherein the active device and the one or more potential target devices are configured to reproduce the content for a user; and a transition module configured for detecting a transition parameter and determining a transition based on the transition parameter and further configured to selectively transition utilizing and reproducing the content on the active device to utilizing and reproducing the content on one of the one or more potential target devices; wherein the device detection module is further configured to track the location of the active device as the active device moves; wherein the transition parameter comprises the location of the active device relative to the one of the one or more potential target devices.

Another embodiment provides a non-transitory computer-readable medium having computer executable instructions for performing a method comprising: detecting an active device utilizing content and reproducing the content for a user; identifying the content and a current location of the content; tracking a location of the active device as the active device moves; detecting one or more potential target devices configured to selectively reproduce the content for the user; detecting a transition parameter; determining whether a transition to one of the one or more potential target devices should occur based on at least the detected transition parameter; and transitioning the content from the active device to one of the one or more potential target devices, wherein the one of the one or more potential target devices begins utilizing the content and reproducing the content; wherein the transition parameter comprises the location of the active device relative to the one of the one or more potential target devices.

In one embodiment, the methods and apparatuses detect an active device configured to utilize content; identify the content and a current location of the content; detect an idle device configured to selectively deliver the content; detect a transition parameter for determining a transition to the idle device; and transition the content from the active device to the idle device wherein the idle device is capable of utilizing the content based on the transition parameter.

Another embodiment provides a system, comprising: a content detection module configured for detecting content and a current location of the content; a device detection module configured for detecting an active device and an idle device and further configured for detecting a location for the active device and a location for the idle device; and a transition module configured for detecting a transition parameter and determining a transition based on the transition parameter and further configured to selectively transition utilizing the content on the active device to utilizing the content on the idle device.

Another embodiment provides a computer-readable medium having computer executable instructions for performing a method comprising: detecting an active device configured to utilize content; identifying the content and a current location of the content; detecting an idle device configured to selectively deliver the content; detecting a transition parameter for determining a transition to the idle device; and transitioning the content from the active device to the idle device wherein the idle device is capable of utilizing the content based on the transition parameter.

BRIEF DESCRIPTION OF THE DRAWINGS

The accompanying drawings, which are incorporated in and constitute a part of this specification, illustrate and explain one embodiment of the methods and apparatuses for synchronizing and managing content over multiple devices. In the drawings.

DETAILED DESCRIPTION

The following detailed description of the methods and apparatuses for synchronizing and managing content over multiple devices refers to the accompanying drawings. The detailed description is not intended to limit the methods and apparatuses for synchronizing and managing content over multiple devices. Instead, the scope of the methods and apparatuses for automatically selecting a profile is defined by the appended claims and equivalents. Those skilled in the art will recognize that many other implementations are possible, consistent with the methods and apparatuses for synchronizing and managing content over multiple devices.

References to "electronic device" includes a device such as a personal digital video recorder, digital audio player, gaming console, a set top box, a personal computer, a cellular telephone, a personal digital assistant, a specialized computer such as an electronic interface with an automobile, and the like.

References to "content" includes audio streams, images, video streams, photographs, graphical displays, text files, software applications, electronic messages, and the like.

References to locating a device or user can be accomplished by utilizing global positioning technology, motion detection sensors, WiFi signal strengths, heat detectors, voice recognition, sound detection, traditional switches within doors and windows, and the like. Further, transmitters that emit a signal may be embedded within the device or attached near the user to aid in tracking the location of the user or device.

In one embodiment, the methods and apparatuses for synchronizing and managing content over multiple devices are configured to manage content across multiple devices. In one embodiment, the content and multiple devices are managed based on parameters such as the location of the user relative to other devices, the location of the device relative to other devices, the usage patterns, connectivity coverage areas, and/or device. In one embodiment, the content is displayed in a seamless fashion across multiple devices and across multiple device connections.

Figure 1:
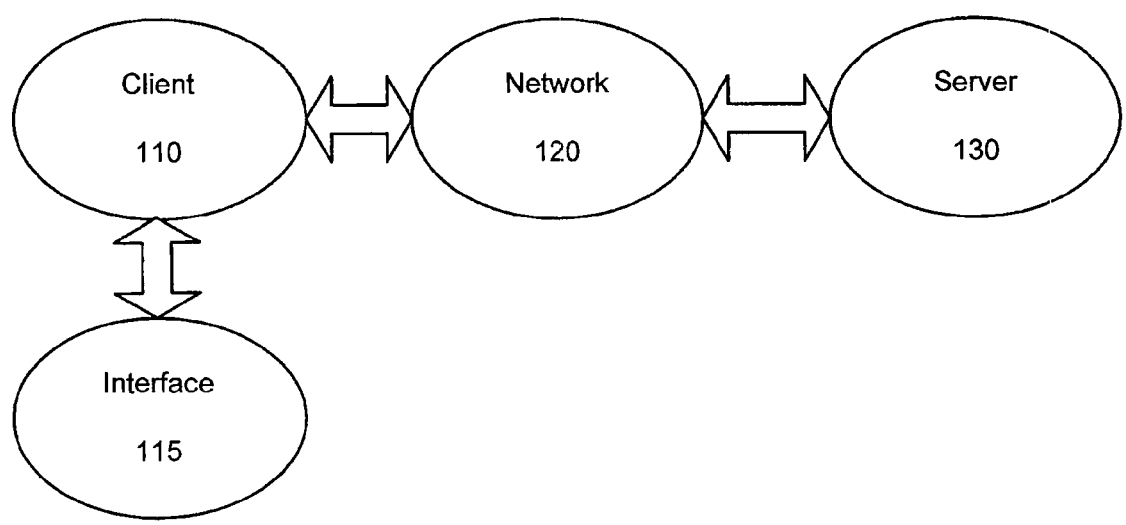
FIG. 1 is a diagram illustrating an environment within which the methods and apparatuses for synchronizing and managing content over multiple devices are implemented.

FIG. 1 is a diagram illustrating an environment within which the methods and apparatuses for synchronizing and managing content over multiple devices are implemented. The environment includes an electronic device 110 (e.g., a computing platform configured to act as a client device, such as a personal digital video recorder, digital audio player, computer, a personal digital assistant, a cellular telephone, a camera device, a set top box, a gaming console), a user interface 115, a network 120 (e.g., a local area network, a home network, the Internet), and a server 130 (e.g., a computing platform configured to act as a server). In one embodiment, the network 120 can be implemented via wireless or wired solutions.

In one embodiment, one or more user interface 115 components are made integral with the electronic device 110 (e.g., keypad and video display screen input and output interfaces in the same housing as personal digital assistant electronics (e.g., as in a Clie® manufactured by Sony Corporation)). In other embodiments, one or more user interface 115 components (e.g., a keyboard, a pointing device such as a mouse and trackball, a microphone, a speaker, a display, a camera) are physically separate from, and are conventionally coupled to, electronic device 110. The user utilizes interface 115 to access and control content and applications stored in electronic device 110, server 130, or a remote storage device (not shown) coupled via network 120.

In accordance with the invention, embodiments for synchronizing and managing content over multiple devices as described below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
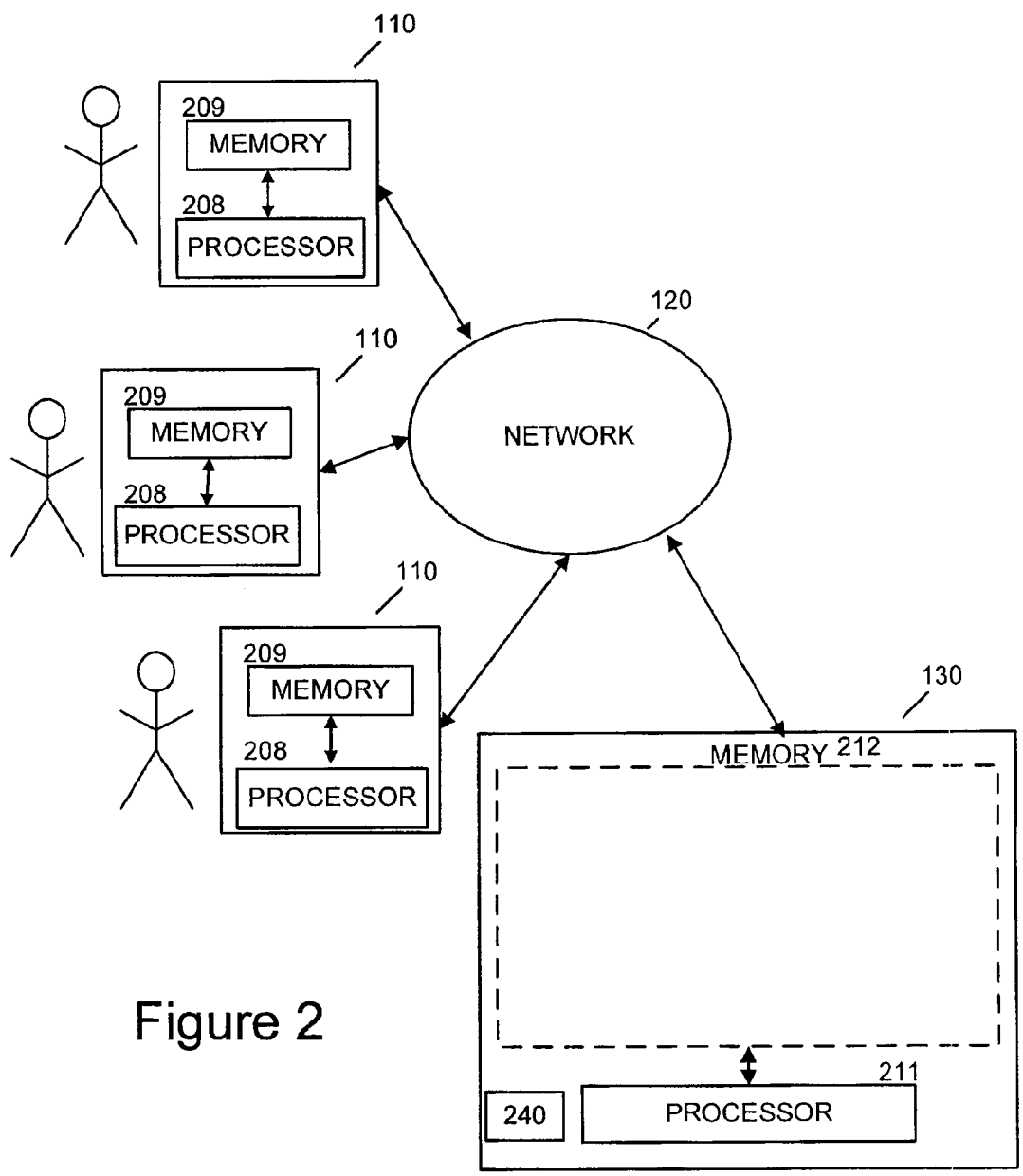
FIG. 2 is a simplified block diagram illustrating one embodiment in which the methods and apparatuses for synchronizing and managing content over multiple devices are implemented.

FIG. 2 is a simplified diagram illustrating an exemplary architecture in which the methods and apparatuses for synchronizing and managing content over multiple devices are implemented. The exemplary architecture includes a plurality of electronic devices 110, a server device 130, and a network 120 connecting electronic devices 110 to server 130 and each electronic device 110 to each other. The plurality of electronic devices 110 are each configured to include a computer-readable medium 209, such as random access memory, coupled to an electronic processor 208. Processor 208 executes program instructions stored in the computer-readable medium 209. A unique user operates each electronic device 110 via an interface 115 as described with reference to FIG. 1.

Server device 130 includes a processor 211 coupled to a computer-readable medium 212. In one embodiment, the server device 130 is coupled to one or more additional external or internal devices, such as, without limitation, a secondary data storage element, such as database 240.

In one instance, processors 208 and 211 are manufactured by Intel Corporation, of Santa Clara, Calif. In other instances, other microprocessors are used.

The plurality of client devices 110 and the server 130 include instructions for a customized application for synchronizing and managing content over multiple devices. In one embodiment, the plurality of computer-readable medium 209 and 212 contain, in part, the customized application. Additionally, the plurality of client devices 110 and the server 130 are configured to receive and transmit electronic messages for use with the customized application. Similarly, the network 120 is configured to transmit electronic messages for use with the customized application.

One or more user applications are stored in memories 209, in memory 211, or a single user application is stored in part in one memory 209 and in part in memory 211. In one instance, a stored user application, regardless of storage location, is made customizable based on synchronizing and managing content over multiple devices as determined using embodiments described below.

Figure 3:
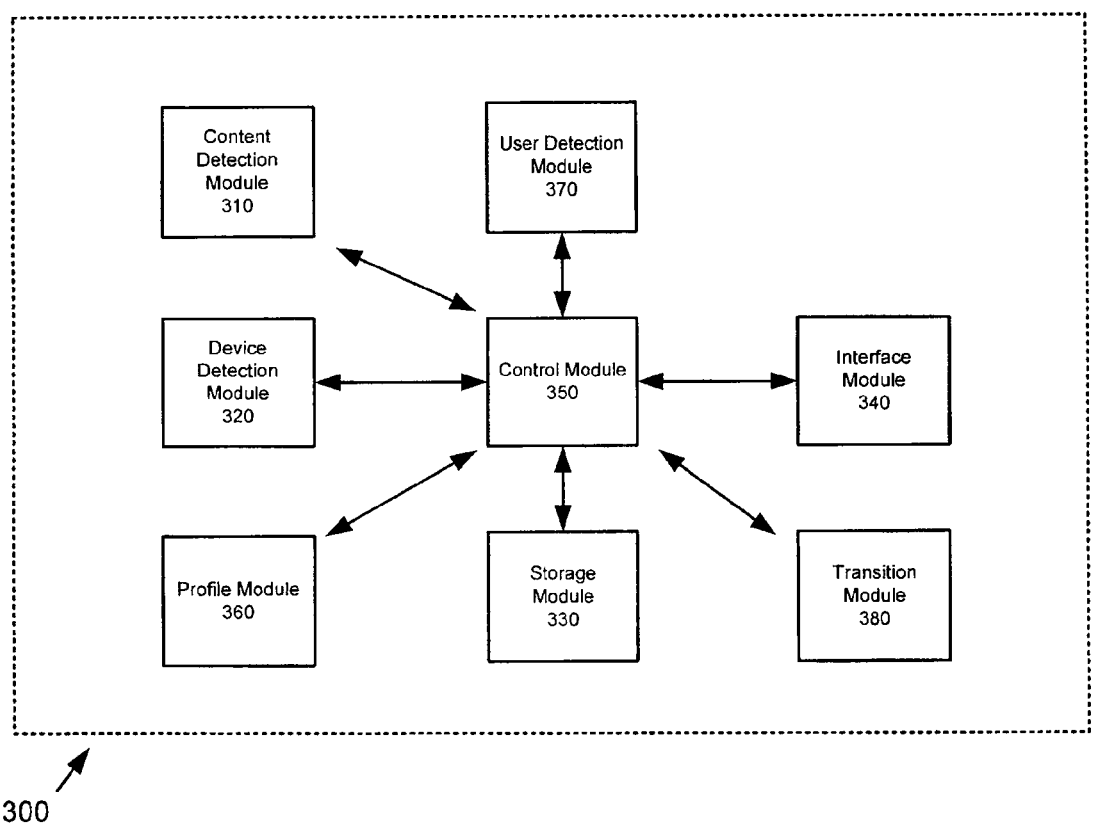
FIG. 3 is a simplified block diagram illustrating a system, consistent with one embodiment of the methods and apparatuses for synchronizing and managing content over multiple devices.

FIG. 3 illustrates one embodiment of a system 300 for synchronizing and managing content over multiple devices. The system 300 includes a content detection module 310, a device detection module 320, a storage module 330, an interface module 340, a control module 350, a profile module 360, a user detection module 370, and a transition module 380.

In one embodiment, the control module 350 communicates with the content detection module 310, the device detection module 320, the storage module 330, the interface module 340, the profile module 360, the user detection module 370, and the transition module 380.

In one embodiment, the control module 350 coordinates tasks, requests, and communications between the content detection module 310, the device detection module 320, the storage module 330, the interface module 340, the profile module 360, the user detection module 370, and the transition module 380.

In one embodiment, the content detection module 310 detects content such as images, text, graphics, video, audio, and the like. In one embodiment, the content includes interactive content associated with a video game, a simulation, and the like. For example, the interactive content may include a location within a video game in progress, a list of players within a video game in progress, a level achieved within a video game in progress, a score of a video game in progress. In one embodiment, the content detection module 310 is configured to uniquely identify the content. In another embodiment, the content detection module 310 is also configured to bookmark a location within the content.

In addition to detecting the content, the content detection module 310 detects a current location of the content while being utilized in one embodiment. If the content is a video and the video is being viewed, then the current location of the video is dynamically detected as the most current point at which the video is being viewed. For example, if the video is being viewed and the most current time stamp of the video is at 1 hour, 23 minutes, and 40 seconds, this time stamp represents the current location of the content. Further, the current location dynamically changes as the content such as the video is being viewed.

In one embodiment, the device detection module 320 detects a presence of devices. In one embodiment, the devices include stationary devices such as video cassette recorders, DVD players, and televisions. In another embodiment, the devices also include portable devices such as laptop computers, cellular telephones, personal digital assistants, portable music players, and portable video players.

In one embodiment, the device detection module 320 detects each device for status, stored content, content being utilized, specific user utilizing the device, and the like. In one embodiment, status of the device includes whether the device is on, off, playing content, and the like.

In one embodiment, the device detection module 320 also detects the location and movement of each device. In one embodiment, a global positioning system (GPS) is included within each device to track the location and movement of each device. In another embodiment, localized sensors are utilized to track the location and movement of each device.

In one embodiment, the device detection module 320 also detects the type of connection that is available to the device. For example, connection types include WiFi access, wired broadband access, satellite access, cellular access, text messaging access, and the like.

In one embodiment, the device detection module 320 also detects signals from each device. The signals may indicate the specific content playing on the device, the location of the device, a desire to switch devices, and the like.

In another embodiment, the signals from each device may also indicate a transition from playing a specific content on one device to playing the specific content on a different device. Further, the signals from each device may also indicate that the device currently playing the specific content is moving out of range of the current connection such as WiFi access.

In one embodiment, the storage module 330 stores a plurality of profiles wherein each profile is associated with various content and other data associated with the content. In one embodiment, the profile stores exemplary information as shown in a profile in FIG. 6. In one embodiment, the storage module 330 is located within the server device 130. In another embodiment, portions of the storage module 330 are located within the electronic device 110.

In one embodiment, the interface module 340 detects the electronic device 110 as the electronic device 110 is connected to the network 120.

In another embodiment, the interface module 340 detects input from the interface device 115 such as a keyboard, a mouse, a microphone, a still camera, a video camera, and the like.

In yet another embodiment, the interface module 340 provides output to the interface device 115 such as a display, speakers, external storage devices, an external network, and the like.

In one embodiment, the profile module 360 processes profile information related to the specific content. In one embodiment, exemplary profile information is shown within a record illustrated in FIGS. 4a and 4b. In one embodiment, each profile corresponds with a particular user. In another embodiment, each profile corresponds with a particular device.

In one embodiment, the user detection module 370 detects the identity of the user of the device. For example, a particular user may be associated with a particular device such that when the particular device is detected, the particular user is also detected. In another example, a particular user may utilize a log-in identification that uniquely identifies the particular user.

In one embodiment, the transition module 380 coordinates a transition associated with changing usage of content on a device, changing connectivity of a device, changing usage of a device, and/or changing a location of a user of a device. For example, content that is being played by the user can be paused, stopped, initiated, or repositioned. This change in usage of the content is noted by the transition module 380 for later use in one embodiment. In another example, the connectivity of the device may change due to movement of the device. In yet another example, the user may choose to change devices while still utilizing the same content prior to switching devices. In yet another example, the user may change locations that would lead to a change in the device being utilized while still utilizing the same content.

In one embodiment, initiation of the transition by the transition module 380 relies on the content detection module 310, the device detection module 320, and/or the user detection module 340. Further, signals may be utilized to notify the transition module 380 of this transition.

The system 300 in FIG. 3 is shown for exemplary purposes and is merely one embodiment of the methods and apparatuses for synchronizing and managing content over multiple devices. Additional modules may be added to the system 300 without departing from the scope of the methods and apparatuses for synchronizing and managing content over multiple devices. Similarly, modules may be combined or deleted without departing from the scope of the methods and apparatuses for synchronizing and managing content over multiple devices.

Figure 4A:
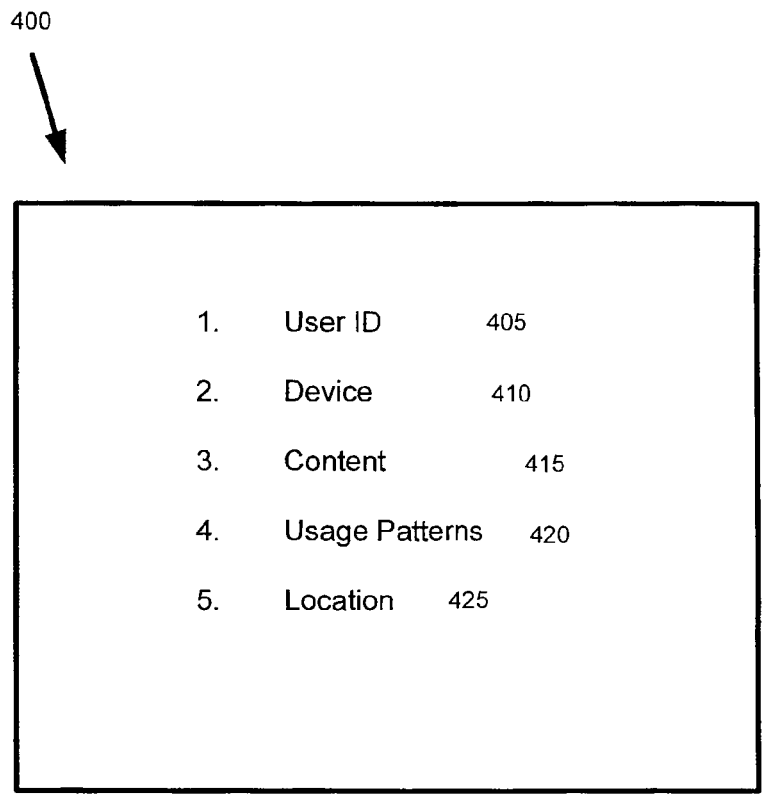
FIG. 4a represents an exemplary profile consistent with one embodiment of the methods and apparatuses for synchronizing and managing content over multiple devices are implemented.

FIG. 4a illustrates a simplified record 400 that corresponds to a profile that describes a user. In one embodiment, the record 400 is stored within the storage module 330 and utilized within the system 300. In one embodiment, the record 400 includes a user identification field 405, a device field 410, a content field 415, a usage pattern field 420, and a location field 425.

In one embodiment, the user identification field 405 identifies a user associated with the record 400. In one example, a user's name is utilized as a label for the user identification field 405.

In one embodiment, the device field 410 identifies device (s) associated with the record 400. In one embodiment, the device(s) identified within the device field 410 represent device(s) that are available to be utilized by the user. In one embodiment, the device(s) identified within the device field 410 represent devices that are activated and currently available for use by the user. In another embodiment, the device(s) identified within the device field 410 represent devices that are associated with the user but may not currently be activated and available for use by the user.

In one embodiment, the content field 415 identifies content that is associated with the user corresponding with the record 400. In one embodiment, the user owns the content. In another embodiment, the user has access to the content. In one embodiment, the content includes audio media, video media, and/or graphical media.

In one embodiment, the usage patterns field 420 stores different usage patterns associated with the user corresponding with the record 400. In one embodiment, typical usage patterns include the specific content or type of content utilized during a particular time of day; the devices utilized; and the connection type of the devices (such as wired broadband, WiFi, cellular, and the like).

In one embodiment, the location field 425 stores location (s) visited by the user. In one embodiment, the location includes the user's place of work, home, transportation routes, and the like.

Figure 4B:
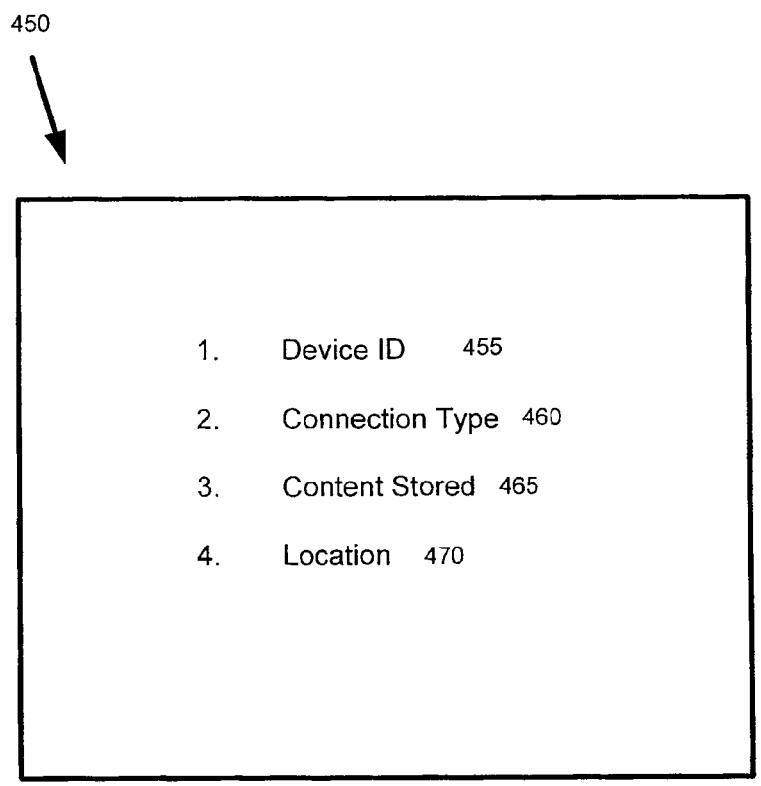
FIG. 4b represents an exemplary profile consistent with one embodiment of the methods and apparatuses for synchronizing and managing content over multiple devices are implemented.

FIG. 4b illustrates a simplified record 450 that corresponds to a profile that describes a device. In one embodiment, the record 450 is stored within the storage module 330 and utilized within the system 300. In one embodiment, the record 450 includes a device identification field 455, a connection type field 460, a content stored field 465, and a location field 470.

In one embodiment, the device identification field 455 identifies a device that is associated with the record 400. In one example, a device's name is utilized as a label for the user identification field 405. In another example, a device's serial number is utilized as a label for the user identification field 405.

In one embodiment, the connection type field 460 identifies a connection associated with the identified device. For example, if the identified device is a laptop computer with a WiFi connection and a wired Ethernet connection, then the connection type may indicate a broadband connection through WiFi and Ethernet. Further, the connection types may be limited via geography/location such that the WiFi connection may only be available in predetermined locations or when a WiFi connection is detected, in one embodiment.

In one embodiment, the content stored field 465 identifies content that is stored within the identified device. In one embodiment, the device locally stores the content. In another embodiment, the device has access to the content. In one embodiment, the content includes audio media, video media, and/or graphical media. In one embodiment, the content includes interactive content associated with a video game, a simulation, and the like. For example, the interactive content may include a location within a video game in progress, a list of players within a video game in progress, a level achieved within a video game in progress, a score of a video game in progress.

In one embodiment, the location field 470 stores location (s) detected by the identified device. In one embodiment, the location includes the user's place of work, home, transportation routes, and the like.

Figure 5:
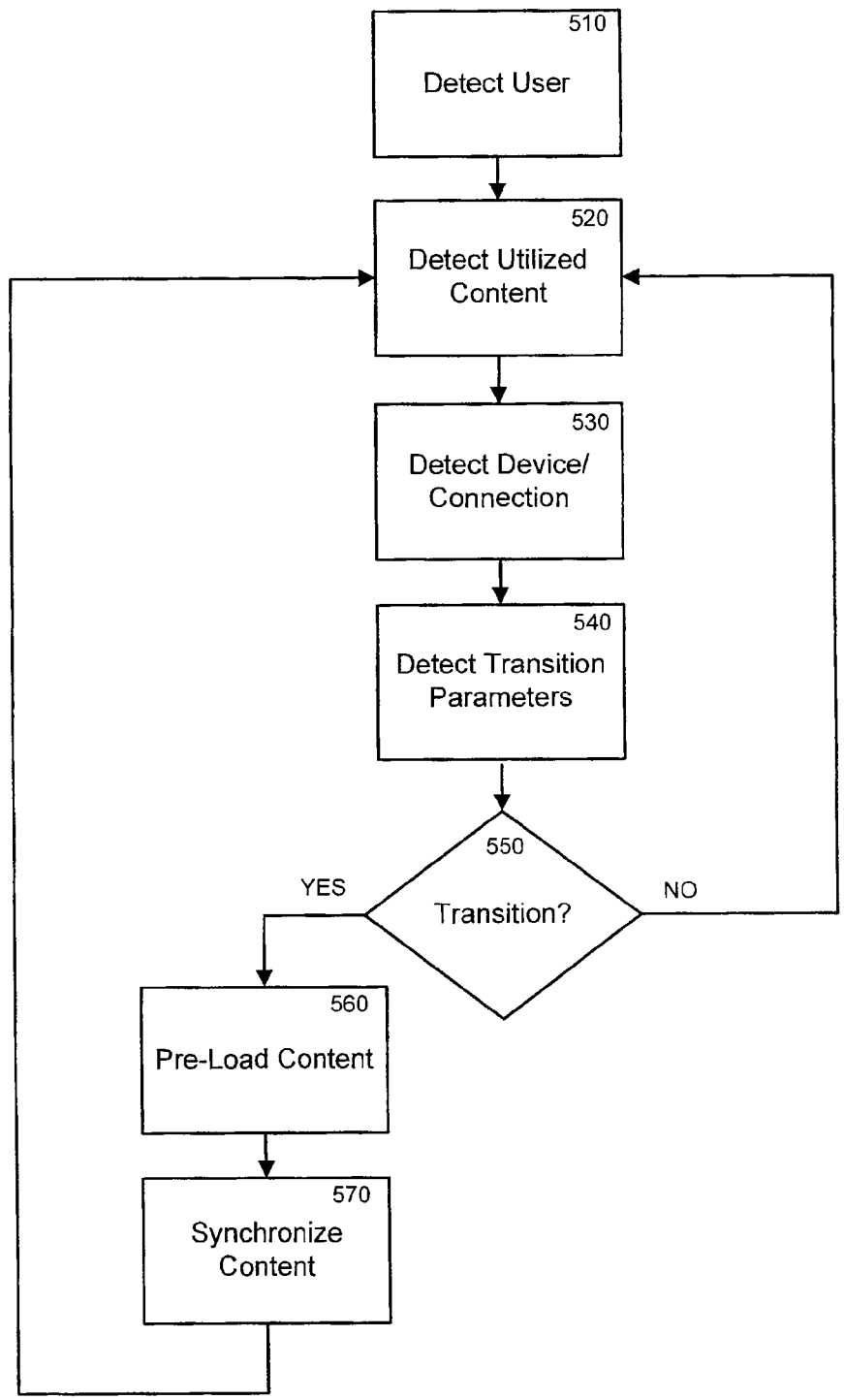
FIG. 5 illustrates an exemplary record consistent with one embodiment of the methods and apparatuses for synchronizing and managing content over multiple devices.
Figure 6:
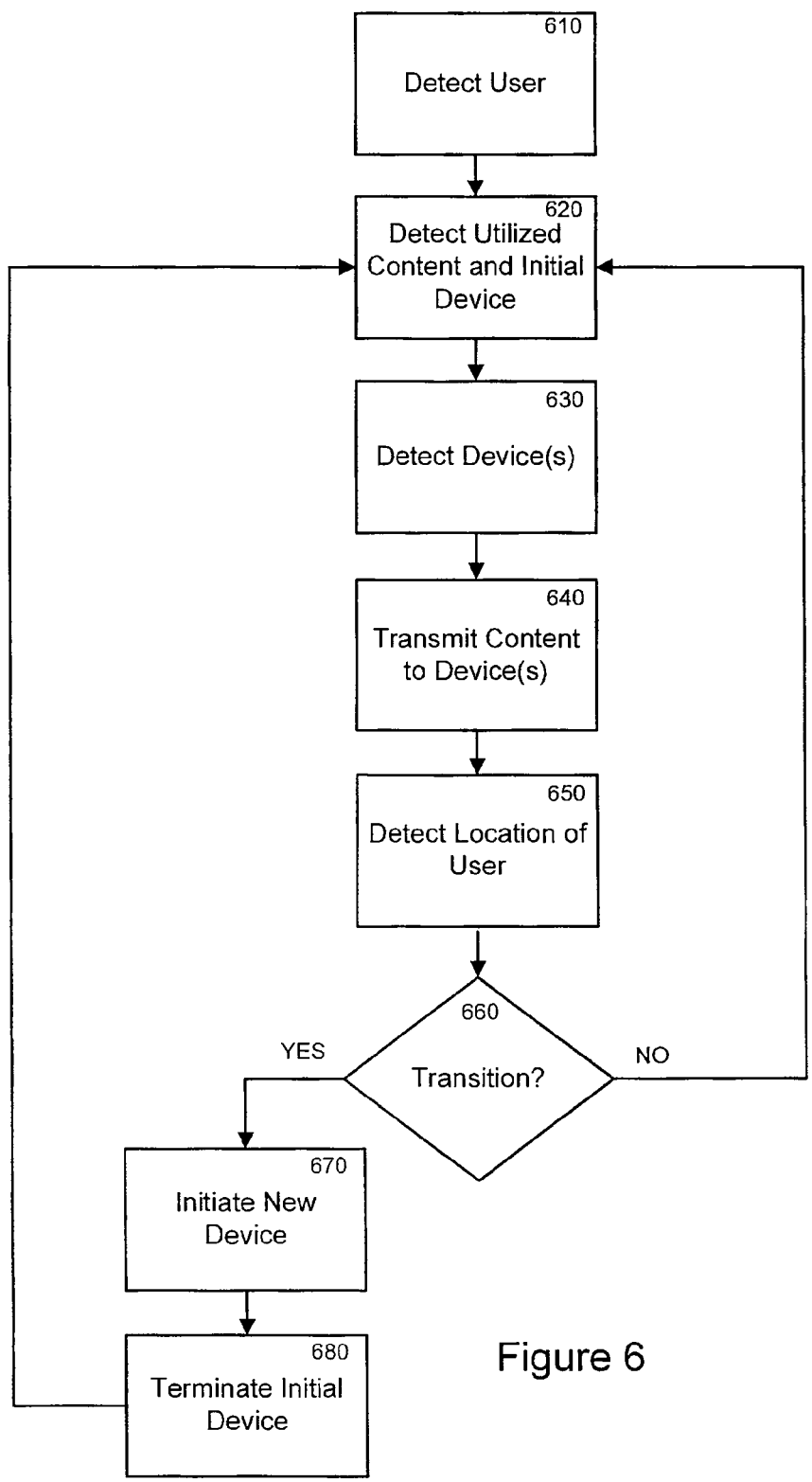
FIG. 6 is a flow diagram consistent with one embodiment of the methods and apparatuses for synchronizing and managing content over multiple devices.

The flow diagrams as depicted in FIGS. 5 and 6 are one embodiment of the methods and apparatuses for synchronizing and managing content over multiple devices. The blocks within the flow diagrams can be performed in a different sequence without departing from the spirit of the methods and apparatuses for synchronizing and managing content over multiple devices. Further, blocks can be deleted, added, or combined without departing from the spirit of the methods and apparatuses for synchronizing and managing content over multiple devices.

The flow diagram in FIG. 5 illustrates transitioning content to different devices according to one embodiment of the invention.

In Block 510, a user is detected. In one embodiment, an exemplary profile as illustrated in FIG. 4a is detected. In one embodiment, the location of the user is also detected.

In Block 520, content that is utilized by the detected user is also detected. In one embodiment, specific content such as a television show that is being viewed by the user is detected and identified. In another embodiment, the current location of the content being utilized is also identified. For example, the current location or time of the television show is identified and updated as the user watches the television show.

In one embodiment, content that is accessed by the user is limited based on the identity of the user. For example, if the user is determined to be a minor, then adult content is not available to this user.

In Block 530, a device that is utilizing the content is identified. In another embodiment, multiple devices that are associated with the user are identified. In this case, devices that are not utilizing the content are also identified. In one embodiment, the locations of the devices are also detected.

In Block 540, transition parameters are detected. In one embodiment, transition parameters include: the location of the user relative to the devices, the location of the device utilizing the content relative to other devices, the location of the device utilizing the content relative to a connection source, the location of the device utilizing the content relative to a predefined defined area, usage patterns, and/or a transition signal.

In one embodiment, as the user moves from an initial location to a target location, the user may move farther from an active device utilizing the content and towards an idle device where both the active and idle devices are associated with the user. This movement from the active device towards the idle device is an exemplary transition parameter and may lead to terminating the content on the active device and initiating the content on the idle device for the user. In one example, the active device is a television in a bedroom, and the idle device another television in the kitchen.

In one embodiment, as an active device that is currently utilizing content moves from an initial location to a target location, the active device may move towards an idle device where both the active and idle devices are associated with the user. This movement of the active device towards the idle device is an exemplary transition parameter and may lead to terminating the content on the active device and initiating the content on the idle device for the user. In one example, the active device is a PDA that is playing a video clip, and the idle device a television capable of viewing the video clip.

In one embodiment, as an active device that is currently utilizing content moves from an initial location to a target location, the active device may move away from a current connection source where the active is delivering content through the current connection source to the user. This movement of the active device away from the current connection source may lead to terminating the content on the active device and initiating the content on a device that is not connected to the current source connection to deliver the content to the user. In one example, the active device is a PDA that is playing a video clip that is streamed from a WiFi network as the current source connection. As the PDA moves out of range from the current source connection, the PDA is configured to continue playing the video clip without the current source connection.

In one embodiment, as an active device that is currently utilizing content moves from an initial location to a target location, the active device may move towards the boundary of a predefined area where the active device is delivering content through a connection within the predefined area to the user. This movement of the active device towards the boundary of the predefined area may lead to terminating the content on the active device and initiating the content on a different device to deliver the content to the user.

In one embodiment, the usage pattern illustrates certain patterns associated with the user such as usage of specific content in particular locations or at particular times. Further, usage patterns may also illustrates patterns associated with usage of particular devices as well.

In one embodiment, the transition signal may be an explicit instruction from the user to begin a transition that indicates an upcoming change in location, device, content, and the like. A button, trigger, or other interface means can be utilized by the user to indicate the transition signal.

In Block 550, a transition is detected. In one embodiment, a transition is detected based on the transition parameters described within the Block 540. In one embodiment, a single transition parameter is utilized to determine a transition. In another embodiment, multiple transition parameters are utilized to determine a transition.

If a transition is not detected within the Block 550, then the utilized content is detected within the Block 520.

If a transition is detected within the Block 550, then additional content is pre-loaded onto a target device in Block 560. In one embodiment, the additional content is identified based on the utilized content. For example, if the utilized content is a video stream, then the additional content that is pre-loaded onto the target device is the remaining, unviewed portion of the video stream in one embodiment. In another example, if the utilized content is a video stream, then the entire video stream is pre-loaded onto the target device such that the entire video stream will be available to the target device.

In one embodiment, the target device is the same device that is utilizing the content within the Block 520. In another embodiment, the target device is a different device from the device that is utilizing the content within the Block 520.

In Block 570, the pre-loaded content on the target device is synchronized based on the current location of the content being utilized within the Block 520. For example, if the pre-loaded content within the target device includes ten minutes of audio stream and only five minutes of the audio stream has been utilized based on the Block 520, then the audio stream on the target device is positioned to the five minute mark in one embodiment.

The flow diagram in FIG. 6 illustrates transitioning to different devices according to one embodiment of the invention.

In Block 610, a user is detected. In one embodiment, an exemplary profile as illustrated in FIG. 4*a* is detected. In one embodiment, the location of the user is also detected.

In Block 620, content and an initial device that is utilized by the detected user is also detected. In one embodiment, specific content such as a television show that is being viewed by the user is detected and identified. In another embodiment, the current location of the content being utilized is also identified. For example, the current location or time of the television show is identified and updated as the user watches the television show. Further, the television device utilized to view the television show is also detected.

In Block 630, devices associated with the user are identified. In this case, devices that are not utilizing the content are also identified. In one embodiment, the locations of the devices are also detected. In one embodiment, the devices identified with the user are demonstrated within the user profile.

In Block 640, content is transmitted to the devices identified within Block 630. In one embodiment, the content is identified based on the utilized content detected in Block 620. For example, if the utilized content is a video stream, then the additional content that is transmitted to the detected devices is the remaining, unviewed portion of the video stream in one embodiment. In another example, if the utilized content is a video stream, then the entire video stream is transmitted to the detected devices such that the entire video stream will be available to the detected devices.

In Block 650, a location of the detected user is tracked. In one embodiment, the location of the detected user tracked by sensors surrounding the detected user. For example, if the detected user is located within the user's home, multiple sensors located throughout the user's home may be utilized to track the location of the user. In another embodiment, a global positioning system may be utilized to track the location of the user. In yet another embodiment, the initial device (detected within the Block 620) may be portable and may follow the user such that tracking the location of the utilized device will also track the location of the user.

In Block 660, transition parameters are utilized. In one embodiment, transition parameters include: the location of the user relative to the devices, the location of the device utilizing the content relative to other devices, the location of the device utilizing the content relative to a predefined defined area.

In one embodiment, as the user moves from an initial location to a target location, the user may move farther from an active device utilizing the content and towards an idle device where both the active and idle devices are associated with the user. This movement from the active device towards the idle device is an exemplary transition parameter and may lead to terminating the content on the active device and initiating the content on the idle device for the user. In one example, the active device is a television in a bedroom, and the idle device another television in the kitchen.

In one embodiment, as an active device that is currently utilizing content moves from an initial location to a target location, the active device may move towards an idle device where both the active and idle devices are associated with the user. This movement of the active device towards the idle device is an exemplary transition parameter and may lead to terminating the content on the active device and initiating the content on the idle device for the user. In one example, the active device is a PDA that is playing a video clip, and the idle device a television capable of viewing the video clip.

In one embodiment, as an active device that is currently utilizing content moves from an initial location to a target location, the active device may move towards the boundary of a predefined area where the active device is delivering content through a connection within the predefined area to the user. This movement of the active device towards the boundary of the predefined area may lead to terminating the content on the active device and initiating the content on a different device to deliver the content to the user. For example, the predefined area may include a room within the user's house.

In Block 660, a transition is detected. In one embodiment, a transition is detected based on the transition parameters. In one embodiment, a single transition parameter is utilized to determine a transition. In another embodiment, multiple transition parameters are utilized to determine a transition.

If a transition is not detected within the Block 660, then the utilized content is detected within the Block 620.

If a transition is detected within the Block 660, then a new device is initiated in Block 670. In one embodiment, the new device is selected from the devices detected within the Block 630. In one embodiment, the new device is selected based on the location of the user and/or the location of the initial device within the Block 620.

In one embodiment, initiation of the new device also includes synchronized based on the current location of the utilized content being detected within the Block 620. For example, if the utilized content (which is an audio stream) within the initial device is currently playing at the 30 second mark of the audio stream, then the audio stream on the new device is positioned at the 30 second mark in one embodiment.

In another embodiment, if the user is located far enough away from the initial device and the new device, both the initial device and the new device may pause the utilized content until the user returns within range of either the initial device or the new device.

In Block 680, the initial device is terminated. In one embodiment, the initial device terminates playing the utilized content. In another embodiment, the initial device switches into a "sleep" mode that consumes less power. In yet another embodiment, the initial device switches into an "off" state that consumes almost no power.

In one example, a user has specific usage pattern stored within the user profile and utilizes the system 300 and described embodiments to perform the user's tasks. This example is merely shown to illustrates one embodiment of the invention. In one embodiment, the user detection module 370 detects the user waking up in the morning at the user's house by detecting a light switch being turned on, a motion detector within the user's bedroom, an electronic toothbrush being used, and the like. Based on the location of the user, the stereo in the user's bathroom is activated and the news station provides the morning news to the user based on the user's usage patterns stored within the user's profile. Next, a motion detection sensor can detect the user moving into a different room within the user's house. In one embodiment, the device detection module 320 detects other devices that are near the user as the user moves through the house. In one embodiment, the content detection module 310 tracks the content utilized by the user (the morning news). Through the transition module 380, the morning news is initiated on a different device such as a television device within the user's living room as the user moves into the living room. As the user moves out of the bathroom and into the living room, the stereo providing the morning news to the bathroom area is terminated. As the user prepares to leave his house in the morning, the system 300 begins another transition as a variety of news content is pre-loaded onto the user's portable audio player. In this example, the portable audio player is not equipped with a wireless connection, so the content is pre-loaded with news content for the user prior to disconnecting with the docking station at the user's house.

As the user leaves the house, the devices within the house are terminated in one embodiment. The user is able to continue receiving news content through the portable audio player as the user leaves the house. Although the news content on the portable audio player is no longer streaming in real-time after the user disconnects the portable audio player from the docking station, the pre-loaded content on the portable audio player may contain news content from a variety of sources.

In another embodiment, if the user was listening to a pre-recorded audio stream while in the user's house, the pre-loaded content transmitted to the portable audio player would be this pre-recorded audio stream. As the user leaves the house, the pre-recorded audio stream on the portable audio player would begin playing where the user left off prior to leaving the house.

In another embodiment, when the user returns to a location that allows the portable audio player to be connected via a WiFi connection or a wired connection, additional content is streamed to the portable audio player for recording for future use or utilized in real time by the user.

In another example, a user of a gaming console may be playing a game. During the game, the user may wish to disconnect the gaming console and physically bring the gaming console to a friend's house. In one embodiment, the location of the current game as paused by the user is stored and the gaming console is placed in a sleep or power off mode to conserve power. Once plugged back in at the user's destination (at the friend's house), then the gaming console is placed into an active mode and can resume the current game where the user stopped prior to moving the gaming console.

The foregoing descriptions of specific embodiments of the invention have been presented for purposes of illustration and description. For example, the invention is described within the context of dynamically detecting and generating image information as merely one embodiment of the invention. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
    detecting an active device utilizing content and reproducing the content for a user;
    identifying the content and a current location of the content;
    tracking a location of the active device as the active device moves;
    detecting one or more potential target devices configured to selectively reproduce the content for the user;

detecting a transition parameter;
determining whether a transition to one of the one or more potential target devices should occur based on at least the detected transition parameter; and
transitioning the content from the active device to one of the one or more potential target devices, wherein the one of the one or more potential target devices begins utilizing the content and reproducing the content;
wherein the transition parameter comprises the location of the active device relative to the one of the one or more potential target devices.

2. The method according to claim 1, wherein the detecting one or more potential target devices comprises obtaining a list of devices associated with the user from a profile for the user, detecting a presence of devices included on the list, and then detecting each of the present devices for information including status, stored content, and content being utilized.

3. The method according to claim 1, wherein a plurality of transition parameters are used to determine the transition.

4. The method according to claim 1, further comprising detecting a location of the user.

5. The method according to claim 1, wherein the transition parameter further comprises at least one of: a usage pattern, and a transition signal.

6. The method according to claim 1, further comprising storing the current location of the content.

7. The method according to claim 1, further comprising terminating the active device based on the transition parameter.

8. The method according to claim 1, further comprising initiating the one of the one or more potential target devices to utilize the content and reproduce the content at the current location of the content.

9. The method according to claim 1, further comprising preloading the content onto the one of the one or more potential target devices.

10. The method according to claim 1, further comprising preloading additional content onto the one of the one or more potential target devices.

11. The method according to claim 1, further comprising simultaneously utilizing the content on the active device and the one of the one or more potential target devices.

12. The method according to claim 1, wherein the transitioning the content from the active device to one of the one or more potential target devices comprises transitioning the content from the active device to one of the one or more potential target devices when the location of the active device is within a first distance from the one of the one or more potential target devices.

13. The method according to claim 1, wherein the transitioning the content from the active device to one of the one or more potential target devices comprises pausing the content on the active device when the location of the active device is within a second distance from the one of the one or more potential target devices.

14. A system, comprising:
a processor; and
a non-transitory computer readable storage medium storing computer executable instructions which, when executed by the processor, cause the processor to perform the steps of:
detecting content and a current location of the content;
detecting an active device and one or more potential target devices and further configured for detecting a location for the active device and a location for the one or more potential target devices, wherein the active device and the one or more potential target devices are configured to reproduce the content for a user; and
detecting a transition parameter and determining a transition based on the transition parameter and further configured to selectively transition utilizing and reproducing the content on the active device to utilizing and reproducing the content on one of the one or more potential target devices;
wherein detecting the active device further comprises tracking the location of the active device as the active device moves;
wherein the transition parameter comprises the location of the active device relative to the one of the one or more potential target devices.

15. The system according to claim 14, wherein the detecting one or more potential target devices comprises obtaining a list of devices associated with the user from a profile for the user, detecting a presence of devices included on the list, and then detecting each of the present devices for information including status, stored content, and content being utilized.

16. The system according to claim 14, wherein a plurality of transition parameters are used to determine the transition.

17. The system according to claim 14, wherein the processor is further caused to perform the step of detecting a location of the user.

18. The system according to claim 14, wherein the transition parameter further comprises at least one of: a usage pattern, and a transition signal.

19. The system according to claim 14, wherein the processor is further caused to perform the step of synchronizing the content such that the one of the one or more potential target devices is configured to utilize the content at the current location of the content.

20. A non-transitory computer-readable medium having computer executable instructions for performing a method comprising:
detecting an active device utilizing content and reproducing the content for a user;
identifying the content and a current location of the content;
tracking a location of the active device as the active device moves;
detecting one or more potential target devices configured to selectively reproduce the content for the user;
detecting a transition parameter;
determining whether a transition to one of the one or more potential target devices should occur based on at least the detected transition parameter; and
transitioning the content from the active device to one of the one or more potential target devices, wherein the one of the one or more potential target devices begins utilizing the content and reproducing the content;
wherein the transition parameter comprises the location of the active device relative to the one of the one or more potential target devices.

21. The non-transitory computer-readable medium according to claim 20, wherein the detecting one or more potential target devices comprises obtaining a list of devices associated with the user from a profile for the user, detecting a presence of devices included on the list, and then detecting each of the present devices for information including status, stored content, and content being utilized.

22. The non-transitory computer-readable medium according to claim 20, wherein a plurality of transition parameters are used to determine the transition.

23. The non-transitory computer-readable medium according to claim 20, wherein the method further comprises detecting a location of the user.

24. The non-transitory computer-readable medium according to claim 20, wherein the transition parameter further comprises at least one of: a usage pattern, and a transition signal.

* * * * *